United States Patent Office 2,865,727
Patented Dec. 23, 1958

2,865,727

ROCKET MOTOR LIQUID PROPELLANT COMBINATION

Jay W. De Dapper, Los Angeles, Calif., assignor to North American Aviation, Inc.

No Drawing. Application December 4, 1950
Serial No. 199,151

5 Claims. (Cl. 52—5)

This invention pertains to rocket motor propellants, and particularly to an improved rocket motor fuel and constituents therefor for use in connection with white fuming or red fuming nitric acid as an oxidizer.

It has been found desirable to utilize in rocket motors, fuel and oxidizer combinations which ignite almost instantaneously upon contact with each other. In a rocket, the fuel and oxidizer are carried in separate compartments or tanks and are combined in the combustion chamber at a relatively steady rate by means of propellant injectors. The fuel and the oxidizer are forced through the orifices of the injectors so that a stream of oxidizer impinges upon a stream of fuel within the combustion chamber of the rocket motor. The mixture of oxidizer and fuel therefore tends to be imperfect. Furthermore, since a rocket motor must, because of its flight and altitude range, be adapted for use under variable atmospheric pressures and temperatures, it is highly essential that the reaction of the fuel and oxidizer be instantaneous and highly uniform. The particular combination of white or red fuming nitric acid as an oxidizer, and turpentine as a fuel, has proved unsatisfactory because although under ideal laboratory conditions the acid and turpentine react quite violently and sometimes ignite, the conditions encountered in the combustion chamber of a rocket motor in flight at high altitudes are not ideal for the reasons above-enumerated.

It is an object of this invention to provide an improved liquid rocket motor fuel for use with nitric acid as an oxidizer.

It is another object of this invention to improve the ignition speed of turpentine and nitric acid when used as propellants in a rocket motor.

It is another object of this invention to provide an improved self-igniting rocket motor propellant combination.

Other objects of invention will become apparent from the following description in which the invention is set forth.

In accordance with this invention it has been discovered that the addition of a relatively small amount of lithium aluminum hydride to the turpentine promotes the reaction of the acid with the turpentine to such an extent that dependable instantaneous combustion of the acid and turpentine may be obtained even under the adverse conditions presented by a rocket motor combustion chamber. Lithium aluminum hydride does not react appreciably with turpentine. Commercial turpentine normally contains approximately one percent of terpene alcohol with which lithium aluminum hydride does react to a limited extent. Lithium aluminum hydride, which occurs as a powder, dissolves to a limited extent in turpentine. Its utility as a promoter for the combustion of nitric acid and turpentine, however, can be increased to the extent that more of it can be put into solution with turpentine. In accordance with this invention it has been discovered that it is possible to dissolve lithium aluminum hydride in an ethereal liquid substance selected from the group including diethyl ether, tetrahydrofuran, dimethyl Cellosolve, dibutyl ether, and dioxane. Lithium aluminum hydride, it has been discovered, is soluble (at 25° C. as an example) in these liquids in the following proportions:

30 grams lithium aluminum hydride/100 grams diethyl ether
13 grams/100 grams tetrahydrofuran
10 grams/100 grams dimethyl Cellosolve
2 grams/100 grams dibutyl ether
0.1 gram/100 grams dioxane These ethereal compounds, it has been further discovered, are in turn miscible in turpentine, and their miscibility is not affected by the solution in them of lithium aluminum hydride in the above-listed proportions. If a rocket motor fuel is then compounded of turpentine and a solution selected from the above group in a proportion in excess of 80% by weight of turpentine it is found that the fuel reacts violently with white fuming or red fuming nitric acid, or with mixtures thereof in any proportion, and ignites instantaneously upon contact with the acid—not only under laboratory conditions, but also at temperatures as low as −60° C. in the combustion chamber of a rocket motor. Since commercially available turpentine normally contains aproximately one percent terpene alcohol, some of the lithium aluminum hydride dissolved in the ethereal solvent reacts with the terpene alcohol. To the extent that such reaction occurs, the lithium aluminum hydride may be less effective in promoting the combustion of the acid and turpentine. It is therefore preferable to use turpentine in which the terpene alcohol content is a minimum. It has been found that this limited reaction does not appreciably diminish the effectiveness of adding lithium aluminum hydride to the turpentine in the manner herein disclosed. Since lithium aluminum hydride dissolves more readily in diethyl ether than in any of the other ethereal solvents, a smaller percentage of lithium aluminum hydride saturated diethyl ether added to turpentine produces the same effect as a larger percentage of, for example, lithium aluminum hydride saturated dioxane added to turpentine. The members of this group of ethereal solvents also possess the unique property of being acceptable, though not entirely ideal, rocket motor fuels from the standpoint of specific impulse. Their addition to turpentine in amounts up to 20% by weight therefore does not seriously affect the thrust producing quality of the fuel, but does greatly enhance the ignition qualities thereof.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A rocket motor propellant comprising up to 20% by weight of diethyl ether in excess of 70% by weight turpentine and as much lithium aluminum hydride as is soluble in the mixture of diethyl ether and turpentine.

2. The method of increasing the reaction rate of turpentine and fuming nitric acid comprising adding to the turpentine up to 20% by weight of diethyl ether and saturating the resultant mixture with lithium aluminum hydride.

3. An improved rocket motor fuel comprising up to 20% by weight of an ethereal solution saturated with lithium aluminum hydride and the remainder turpentine.

4. An improved rocket motor fuel comprising not less than 80% turpentine by weight and lithium aluminum hydride dissolved in an ethereal solvent selected from the group consisting of diethyl ether, tetrahydrofuran, dimethyl Cellosolve, dibutyl ether, and dioxane.

5. An improved rocket motor fuel comprising not less than 80% by weight turpentine and the remainder an ethereal liquid in which up to four and one-half percent by weight lithium aluminum hydride is dissolved and which is miscible with turpentine.

References Cited in the file of this patent

UNITED STATES PATENTS

| | | |
|---|---|---|
| 2,489,051 | Sayward et al. | Nov. 22, 1949 |
| 2,563,532 | Kistiakowsky | Aug. 7, 1951 |
| 2,573,471 | Malina et al. | Oct. 30, 1951 |
| 2,576,311 | Schlesinger et al. | Nov. 27, 1951 |
| 2,648,190 | Maisner | Aug. 11, 1953 |

OTHER REFERENCES

Bull.: "Astronautics," No. 29, September 1934, pp. 5, 6, 52—J. & R.

Nystrom et al.: "Jour. Am. Chem. Soc.," vol. 69, pp. 1197–1199 (1947).

Finholt et al.: "Jour. Am. Chem. Soc.," vol. 69, pp. 1199–1203 (1947).

Staff Report: "Chemical and Eng. News," vol. 26, No. 39, September 27, 1948, 52—J. & R., pp. 2892, 2893.

Bowman et al.: "The Journal of Space Flight," vol. 2, No. 1, January 1950, pp. 6–9.